US010031632B2

(12) United States Patent
Brunet et al.

(10) Patent No.: US 10,031,632 B2
(45) Date of Patent: Jul. 24, 2018

(54) PSEUDO DRIVEN SHIELD

(71) Applicant: ATMEL CORPORATION, San Jose, CA (US)

(72) Inventors: Samuel Brunet, Cowes (GB); Richard Paul Collins, Southampton (GB); Luben Hristov Hristov, Sofai (BG); Steinar Myren, Vikhammer (NO); Trond Jarle Pedersen, Trondheim (NO); Paul Stavely, Southampton (GB)

(73) Assignee: Atmel Corporation, Chandler, AZ (US)

( * ) Notice: Subject to any disclaimer, the term of this patent is extended or adjusted under 35 U.S.C. 154(b) by 0 days.

(21) Appl. No.: 15/477,866

(22) Filed: Apr. 3, 2017

(65) Prior Publication Data
US 2017/0205916 A1 Jul. 20, 2017

Related U.S. Application Data

(63) Continuation of application No. 13/930,754, filed on Jun. 28, 2013, now Pat. No. 9,612,677.

(51) Int. Cl.
G06F 3/041 (2006.01)
G06F 3/044 (2006.01)

(52) U.S. Cl.
CPC ............ *G06F 3/044* (2013.01); *G06F 3/0416* (2013.01); *G06F 2203/04104* (2013.01); *G06F 2203/04107* (2013.01); *G06F 2203/04108* (2013.01)

(58) Field of Classification Search
CPC ....................... G06F 2203/04107; G06F 3/044

USPC ............................... 178/18.06; 345/173, 174
See application file for complete search history.

(56) References Cited

U.S. PATENT DOCUMENTS

| 7,663,607 | B2 | 2/2010 | Hotelling |
| 7,864,503 | B2 | 1/2011 | Chang |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 8,217,902 | B2 | 7/2012 | Chang |
| 8,723,824 | B2 | 5/2014 | Myers |
| 2008/0309635 | A1 | 12/2008 | Matsuo |
| 2009/0027068 | A1 | 1/2009 | Philipp et al. |
| 2009/0315854 | A1 | 12/2009 | Matsuo |
| 2010/0007628 | A1 | 1/2010 | Eriguchi et al. |

(Continued)

OTHER PUBLICATIONS

U.S. Appl. No. 61/454,936, filed Mar. 21, 2011, Myers.

(Continued)

*Primary Examiner* — Amr Awad
*Assistant Examiner* — Aaron Midkiff
(74) *Attorney, Agent, or Firm* — Baker Botts L.L.P.

(57) ABSTRACT

In one embodiment, a device includes a controller, first electrodes, second electrodes, a plurality of sensors, and a shield sensor. The controller is operable to cause substantially equal voltages to be present on the first and second electrodes while measuring capacitances of the plurality of first electrodes electrically coupled to the shield sensor and measuring capacitances of the plurality of second electrodes electrically coupled to the plurality of sensors.

20 Claims, 12 Drawing Sheets

(56) References Cited

U.S. PATENT DOCUMENTS

| | | |
|---|---|---|
| 2010/0295559 A1* | 11/2010 | Osoinach .......... H03K 17/9622 324/658 |
| 2011/0181549 A1 | 7/2011 | Hotelling et al. |
| 2012/0242588 A1 | 9/2012 | Myers |
| 2012/0242592 A1 | 9/2012 | Rothkopf |
| 2012/0243151 A1 | 9/2012 | Lynch |
| 2012/0243719 A1 | 9/2012 | Franklin |
| 2013/0076612 A1 | 3/2013 | Myers |
| 2014/0152621 A1 | 6/2014 | Okayama et al. |
| 2014/0218334 A1 | 8/2014 | Shibata et al. |

OTHER PUBLICATIONS

U.S. Appl. No. 61/454,950, filed Mar. 21, 2011, Lynch.
U.S. Appl. No. 61/454,894, filed Mar. 21, 2011, Rothkopf.
S. Brunet, U.S. Appl. No. 13/930,754, Non-final Rejection, dated Mar. 6, 2015.
S. Brunet, U.S. Appl. No. 13/930,754, Amendment after Non-final Rejection, dated Jun. 8, 2015.
S. Brunet, U.S. Appl. No. 13/930,754, Final Rejection, dated Jul. 17, 2015.
S. Brunet, U.S. Appl. No. 13/930,754, Request for Continued Examination and Amendment, dated Oct. 19, 2015.
S. Brunet, U.S. Appl. No. 13/930,754, Non-final Rejection, dated Jan. 7, 2016.
S. Brunet, U.S. Appl. No. 13/930,754, Applicant Initiated Interview Summary, dated Mar. 17, 2016.
S. Brunet, U.S. Appl. No. 13/930,754, Amendment after Non-final Rejection, dated Apr. 7, 2016.
S. Brunet, U.S. Appl. No. 13/930,754, Final Rejection, dated Jul. 22, 2016.
S. Brunet, U.S. Appl. No. 13/930,754, Applicant Initiated Interview Summary, dated Oct. 18, 2016.
S. Brunet, U.S. Appl. No. 13/930,754, Request for Continued Examination and Amendment, dated Oct. 24, 2016.
S. Brunet, U.S. Appl. No. 13/930,754, Notice of Allowance, dated Nov. 18, 2016.

* cited by examiner

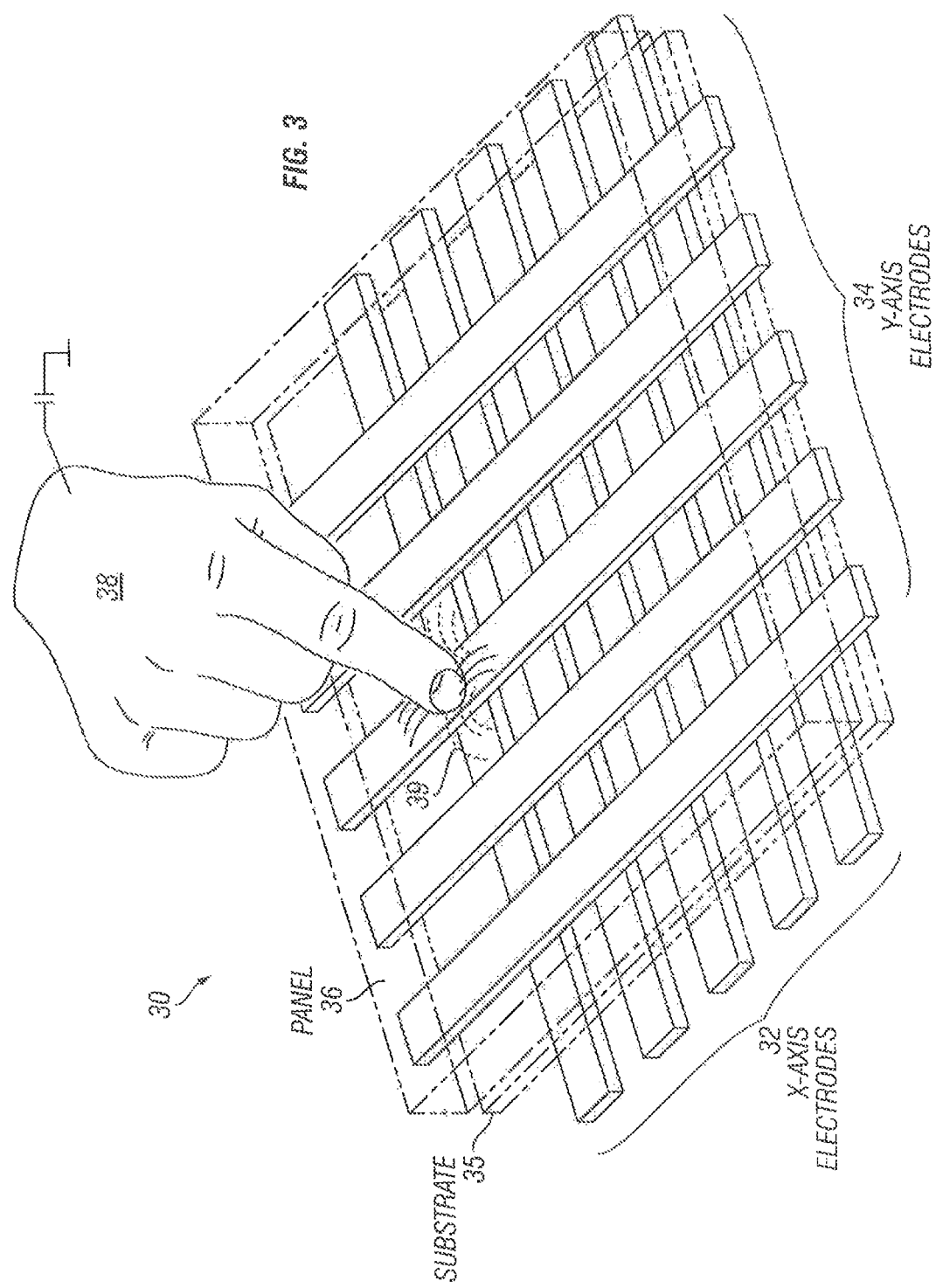

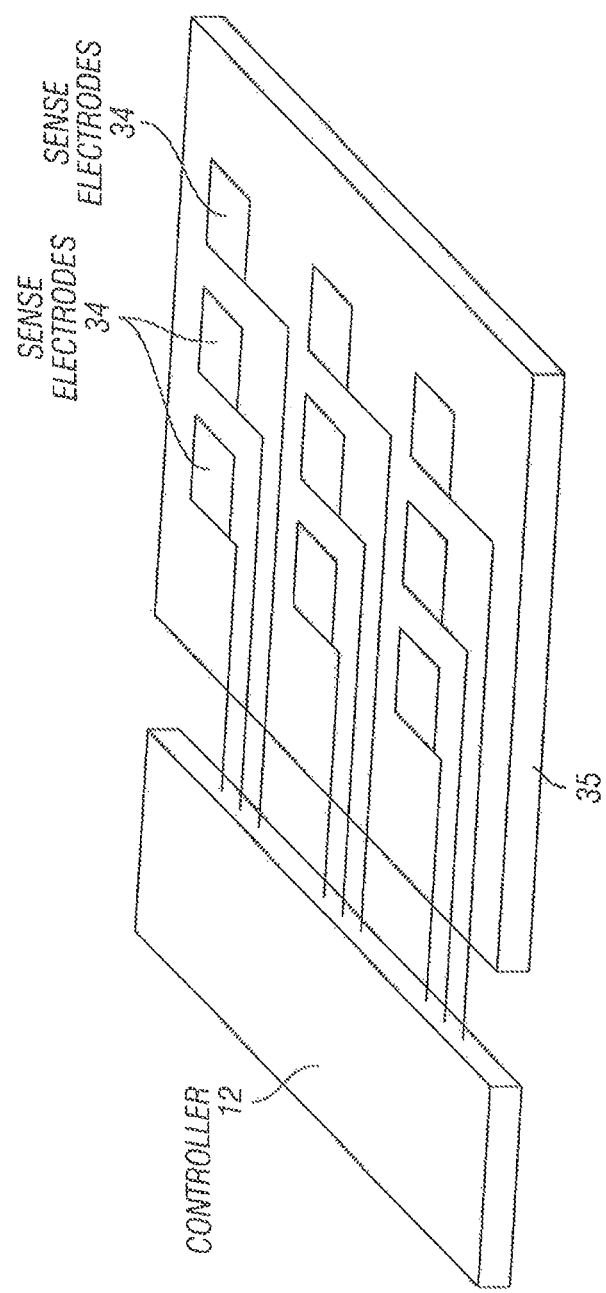

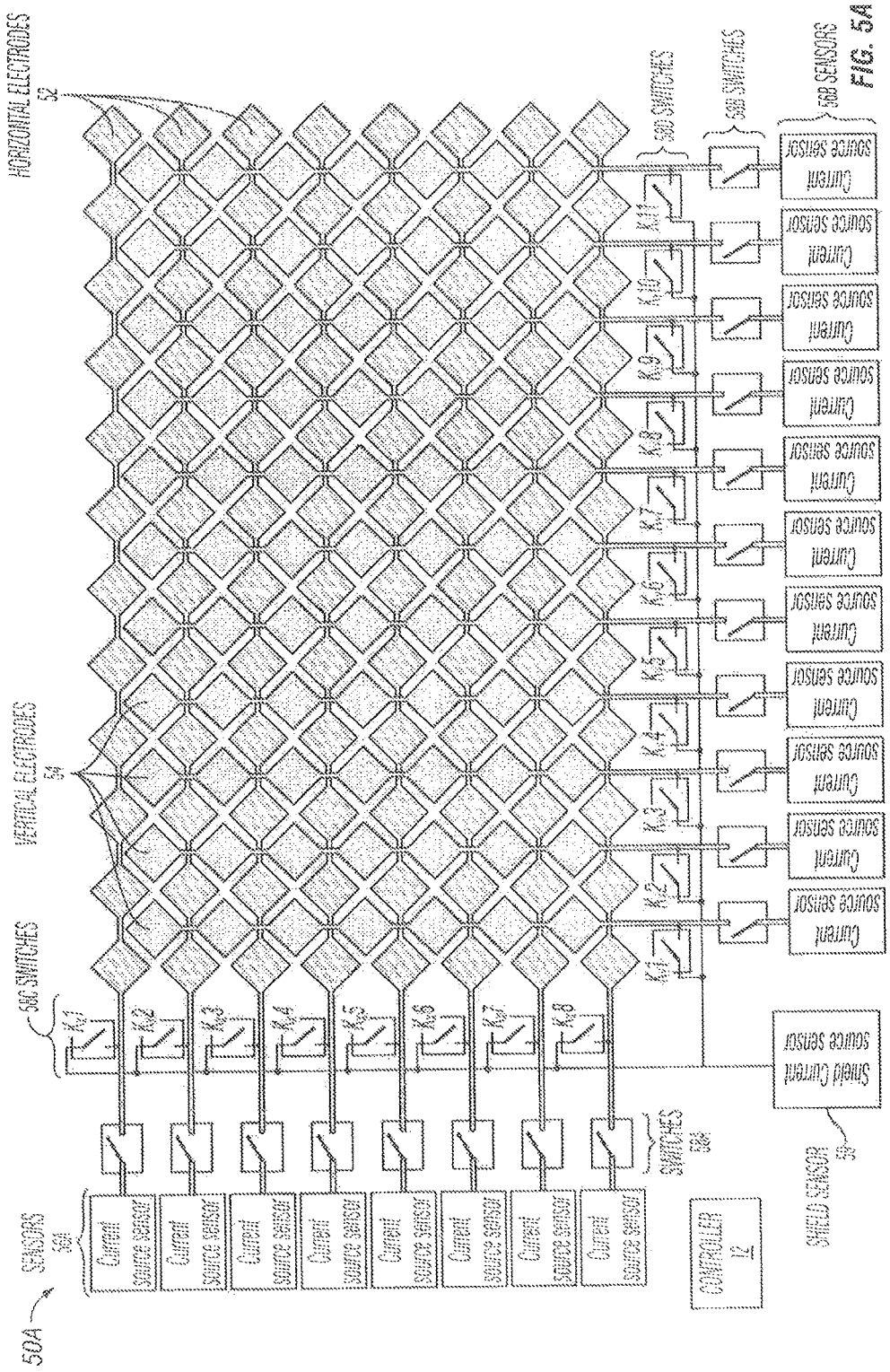

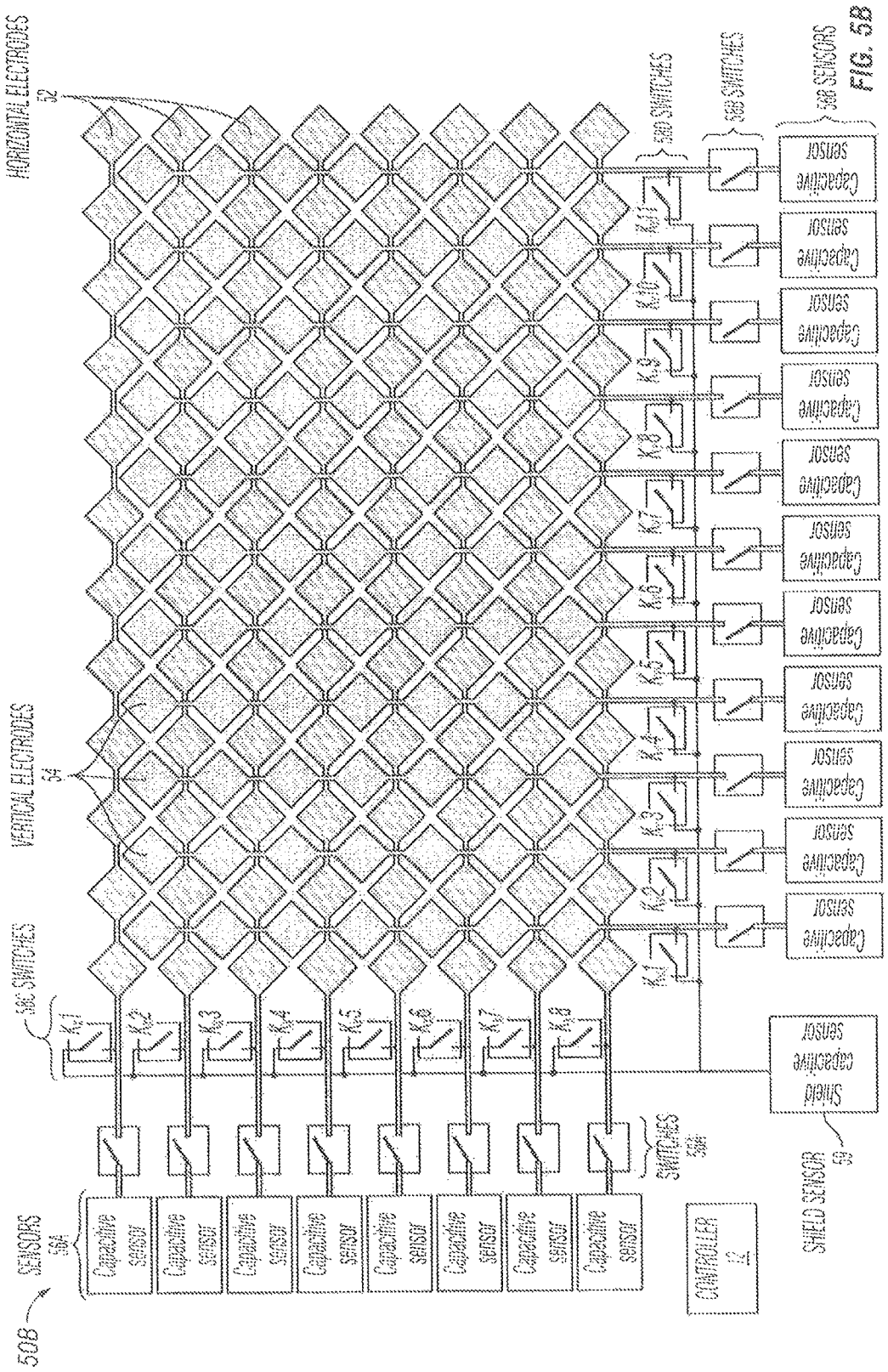

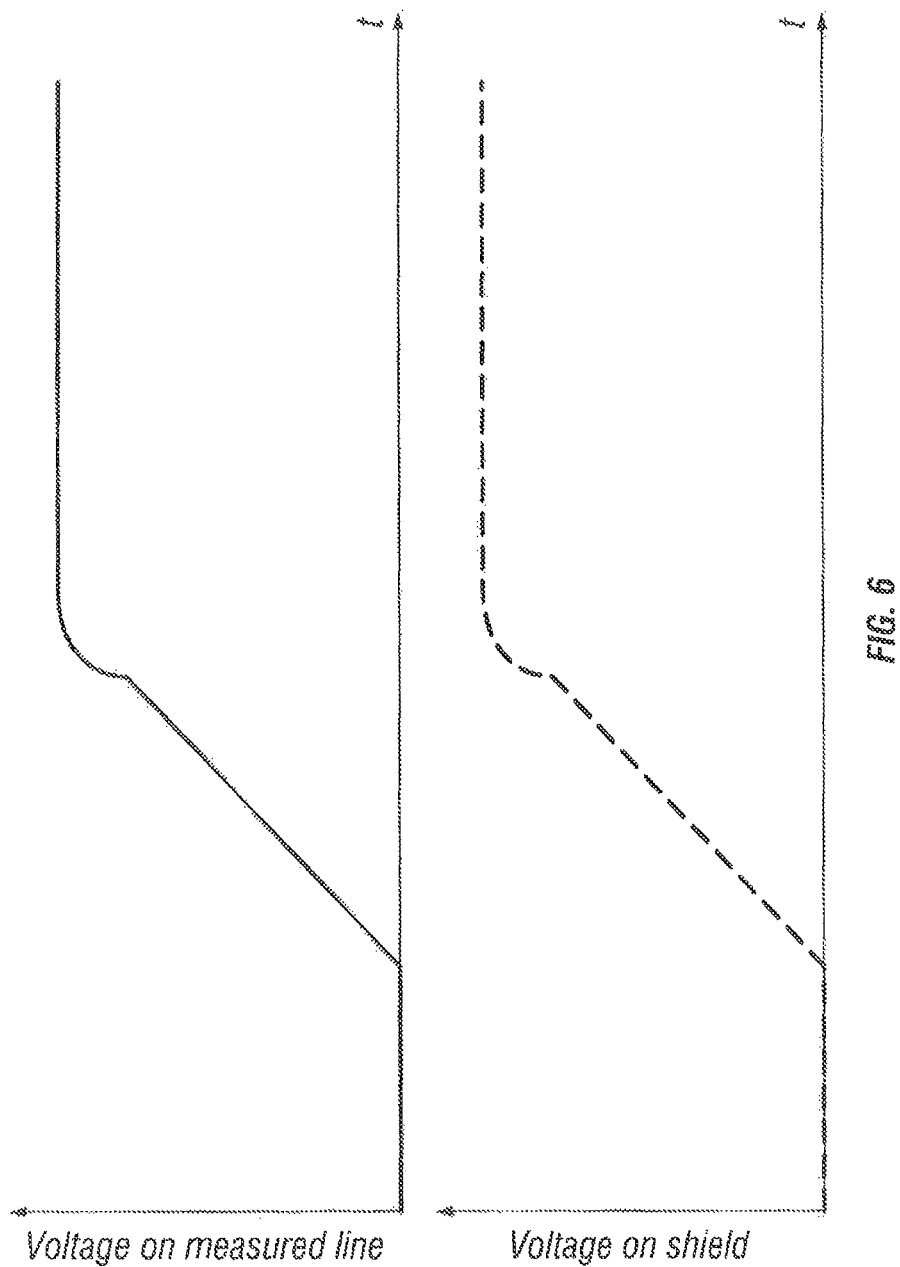

PSEUDO DRIVEN SHIELD

RELATED APPLICATION

This application is a continuation under 35 U.S.C. § 120 of U.S. application Ser. No. 13/930,754, filed Jun. 28, 2013 and entitled "Pseudo Driven Shield", incorporated herein by reference.

TECHNICAL FIELD

This disclosure generally relates to touch sensors.

BACKGROUND

A touch sensor detects the presence and location of a touch or the proximity of an object (such as a user's finger) within a touch-sensitive area of the touch sensor overlaid, for example, on a display screen. In a touch-sensitive-display application, the touch sensor enables a user to interact directly with what is displayed on the screen, rather than indirectly with a mouse or touchpad. A touch sensor may be attached to or provided as part of a desktop computer, laptop computer, tablet computer, personal digital assistant (PDA), smartphone, satellite navigation device, portable media player, portable game console, kiosk computer, point-of-sale device, or other suitable device. A control panel on a household or other appliance may include a touch sensor.

There are different types of touch sensors, such as (for example) resistive touch screens, surface acoustic wave touch screens, capacitive touch screens, infrared touch screens, and optical touch screens. Herein reference to a touch sensor encompasses a touch screen, and vice versa, where appropriate. A capacitive touch screen may include an insulator coated with a substantially transparent conductor in a particular pattern. When an object touches or comes within proximity of the surface of the capacitive touch screen, a change in capacitance occurs within the touch screen at the location of the touch or proximity. A controller processes the change in capacitance to determine the touch position(s) on the touch screen.

BRIEF DESCRIPTION OF THE DRAWINGS

FIG. 3 illustrates an example embodiment of the touch sensor of FIG. 1, according to certain embodiments;

FIG. 4 illustrates another example embodiment of the touch sensor of FIG. 1, according to certain embodiments;

FIGS. 5A-5D illustrate pseudo driven shield switch architectures of the touch sensor of FIG. 1, according to certain embodiments;

FIG. 6 illustrates example voltages present on the electrodes of FIGS. 5A, 5B, and 5D, according to certain embodiments;

DESCRIPTION OF EXAMPLE EMBODIMENTS

Proximity detection for capacitive touch screens involves the ability to detect the presence of an external object in the near vicinity to the screen surface without determining the exact spatial position of the object. For example, the typical detection range may vary from 40 mm to 200 mm and more. Hovering detection, however, involves determining the spatial position of the object relative to the surface before the object touches the surface. A typical range for hovering detection may be between 10 mm and 30 mm.

Information from proximity and hovering detection may be used by a touch-sensitive device such as a smart phone or tablet computer in many different ways. For example, proximity event information may be utilized to wake up the device, for changing the behavior of the system, for illuminating the screen, for showing alerts, and the like. As another example, hovering event information may be utilized to determine where a person's finger is located related to the surface of the screen. Proximity and hovering detection, however, typically involves separate measurement processes and/or cycles by a touch sensor.

The teachings of the disclosure recognize that it would be desirable to combine proximity and hovering detection by a touch sensor. Certain embodiments of the disclosure utilize a pseudo driven shield to cause a substantially equal voltage to be present on non measured electrodes of a touch sensor as the voltage that is present on electrodes of the touch sensor that are being measured. As a result, the touch sensor is able to simultaneously detect proximity and hovering of objects relative to the surface of the screen of the touch sensor. FIGS. 1 through 10 below illustrate a touch sensor of a touch-sensitive device that utilizes a pseudo driven shield to simultaneously perform proximity and hovering detection.

Figure 1:
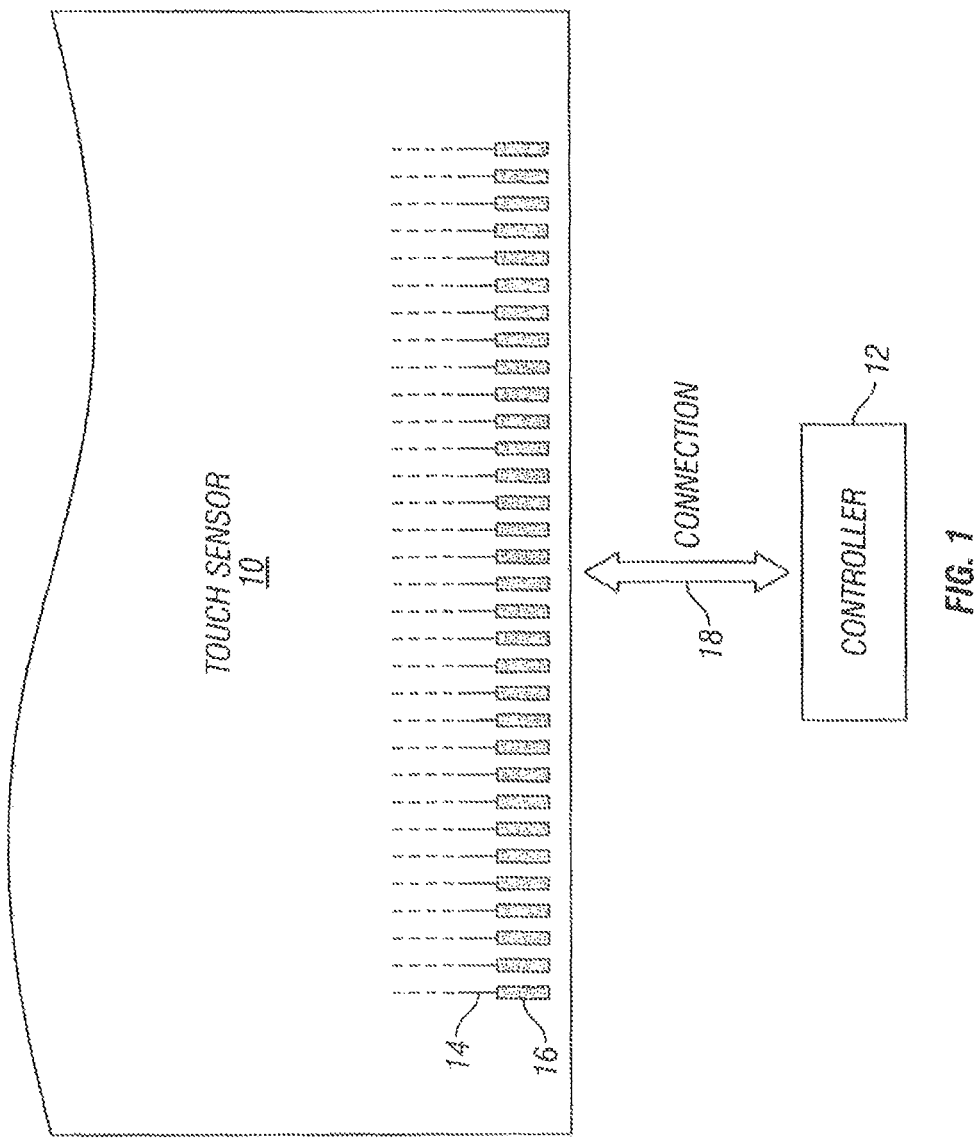
FIG. 1 illustrates an example touch sensor, according to certain embodiments.

FIG. 1 illustrates an example touch sensor 10 with an example controller 12. Herein, reference to a touch sensor may encompass a touch screen, and vice versa, where appropriate. Touch sensor 10 and controller 12 detect the presence and location of a touch or the proximity of an object within a touch-sensitive area of touch sensor 10. Herein, reference to a touch sensor encompasses both the touch sensor and its controller, where appropriate. Similarly, reference to a controller encompasses both the controller and its touch sensor, where appropriate, Touch sensor 10 includes one or more touch-sensitive areas, where appropriate. Touch sensor 10 includes an array of touch electrodes (i.e., drive and/or sense electrodes) disposed on a substrate, which in some embodiments is a dielectric material.

In certain embodiments, one or more portions of the substrate of touch sensor 10 are made of polyethylene terephthalate (PET) or another suitable material. This disclosure contemplates any suitable substrate with any suitable portions made of any suitable material. In particular embodiments, the drive or sense electrodes in touch sensor 10 are made of indium tin oxide (ITO) in whole or in part. In particular embodiments, the drive or sense electrodes in touch sensor 10 are made of fine lines of metal or other conductive material. As an example and not by way of limitation, one or more portions of the conductive material are copper or copper-based and have a thickness of approximately 5 μm or less and a width of approximately 10 μm or less. As another example, one or more portions of the conductive material are silver or silver-based and similarly have a thickness of approximately 5 μm or less and a width of approximately 10 μm or less. This disclosure contemplates any suitable electrodes made of any suitable material.

In certain embodiments, touch sensor 10 implements a capacitive form of touch sensing. In a mutual-capacitance implementation, touch sensor 10 includes an array of drive and sense electrodes forming an array of capacitive nodes.

In certain embodiments, a drive electrode and a sense electrode form a capacitive node. The drive and sense electrodes forming the capacitive node come near each other, but do not make electrical contact with each other. Instead, the drive and sense electrodes are capacitively coupled to each other across a gap between them. A pulsed or alternating voltage applied to the drive electrode (i.e., by controller 12) induces a charge on the sense electrode, and the amount of charge induced is susceptible to external influence (such as a touch or the proximity of an object). When an object touches or comes within proximity of the capacitive node, a change in capacitance occurs at the capacitive node and controller 12 measures the change in capacitance. By measuring changes in capacitance throughout the array, controller 12 determines the position of the touch or proximity within the touch-sensitive area(s) of touch sensor 10.

In particular embodiments, one or more drive electrodes together form a drive line running horizontally or vertically or in any suitable orientation. Similarly, one or more sense electrodes together form a sense line running horizontally or vertically or in any suitable orientation. In particular embodiments, drive lines run substantially perpendicular to sense lines. Herein, reference to a drive line encompasses one or more drive electrodes making up the drive line, and vice versa, where appropriate. Similarly, reference to a sense line encompasses one or more sense electrodes making up the sense line, and vice versa, where appropriate.

In certain embodiments, touch sensor 10 has a single-layer mutual capacitance configuration, with drive and sense electrodes disposed in a pattern on one side of a substrate. In such a configuration, a pair of drive and sense electrodes capacitively coupled to each other across a space between them forms a capacitive node. In a configuration for a self-capacitance implementation, as illustrated in FIG. 4, electrodes of only a single type (e.g. sense) are disposed in a pattern on the substrate. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 is operable to detect and process the change in capacitance to determine the presence and location of the touch or proximity input. Certain embodiments if controller 12 communicate information about the touch or proximity input to one or more other components (such one or more central processing units (CPUs) or digital signal processors (DSPs)) of a device that includes touch sensor 10 and controller 12, which may respond to the touch or proximity input by initiating a function of the device (or an application running on the device) associated with it. Although this disclosure describes a particular controller having particular functionality with respect to a particular device and a particular touch sensor, this disclosure contemplates any suitable controller having any suitable functionality with respect to any suitable device and any suitable touch sensor.

In certain embodiments, controller 12 is one or more integrated circuits (ICs)—such as for example general-purpose microprocessors, microcontrollers, programmable logic devices or arrays, and application-specific ICs (ASICs). In some embodiments, controller 12 is coupled to a flexible printed circuit (FPC) bonded to the substrate of touch sensor 10, as described below. In some mutual capacitance embodiments, controller 12 includes a processor unit, a drive unit, a sense unit, and a storage unit. The drive unit supplies drive signals to the drive electrodes of touch sensor 10. The sense unit senses charge at the capacitive nodes of touch sensor 10 and provides measurement signals to the processor unit representing capacitances at the capacitive nodes. The processor unit controls the supply of drive signals to the drive electrodes by the drive unit and process measurement signals from the sense unit to detect and process the presence and location of a touch or proximity input within the touch-sensitive area(s) of touch sensor 10. The processor unit also tracks changes in the position of a touch or proximity input within the touch-sensitive area(s) of touch sensor 10. The storage unit, which includes one or more memory devices, stores programming for execution by the processor unit, including programming for controlling the drive unit to supply drive signals to the drive electrodes, programming, for processing measurement signals from the sense unit, and other suitable programming, where appropriate. In self capacitance embodiments, controller 12 is operable to both drive and measure electrodes that are each individually a sense and drive electrode. Although this disclosure describes a particular controller having a particular implementation with particular components, this disclosure contemplates any suitable controller having any suitable implementation with any suitable components.

Tracks 14 of conductive material disposed on the substrate of touch sensor 10 couple the drive or sense electrodes of touch sensor 10 to connection pads 16, also disposed on the substrate of touch sensor 10. As described below, connection pads 16 facilitate coupling of tracks 14 to controller 12. In certain embodiments, tracks 14 extend into or around (e.g. at the edges of) the touch-sensitive area(s) of touch sensor 10. Particular tracks 14 provide drive connections for coupling controller 12 to drive electrodes of touch sensor 10, through which the drive unit of controller 12 supplies drive signals to the drive electrodes. Other tracks 14 provide sense connections for coupling controller 12 to sense electrodes of touch sensor 10, through which the sense unit of controller 12 senses charge at the capacitive nodes of touch sensor 10. In certain embodiments, tracks 14 are made of fine lines of metal or other conductive material. As an example and not by way of limitation, the conductive material of tracks 14 is copper or copper-based and have a width of approximately 100 μm or less. As another example, the conductive material of tracks 14 is silver or silver-based and have a width of approximately 100 μm or less. In particular embodiments, tracks 14 are made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, certain embodiments of touch sensor 10 include one or more ground lines terminating at a ground connector (similar to a connection pad 16) at an edge of the substrate of touch sensor 10 (similar to tracks 14).

In certain embodiments, connection pads 16 are located along one or more edges of the substrate, outside the touch-sensitive area(s) of touch sensor 10. As described above, controller 12 is on an FPC in certain embodiments. In some embodiments, connection pads 16 are made of the same material as tracks 14 and are bonded to the FPC using an anisotropic conductive film (ACF). In certain embodiments, connection 18 includes conductive lines on the FPC coupling controller 12 to connection pads 16, in turn coupling controller 12 to tracks 14 and to the drive or sense electrodes of touch sensor 10. In another embodiment, connection pads 160 are inserted into an electro-mechanical connector (such as a zero insertion force wire-to-board connector); in this embodiment, connection 180 does not need to include an FPC. This disclosure contemplates any suitable connection 18 between controller 12 and touch sensor 10.

Figure 2:
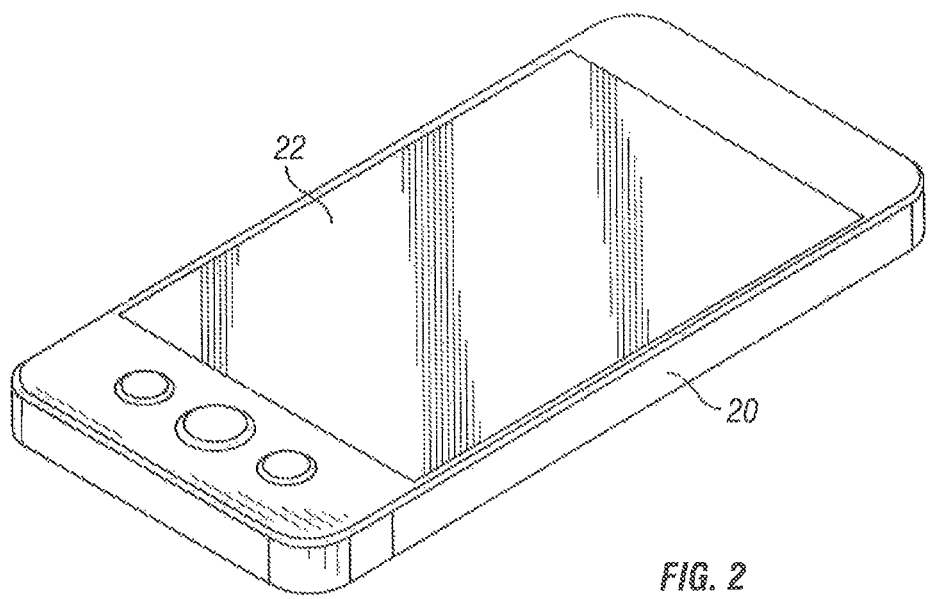
FIG. 2 illustrates an example device that utilizes the touch sensor of FIG. 1, according to certain embodiments.

FIG. 2 illustrates an example device 20 that utilizes touch sensor 10 of FIG. 1. Device 20 includes any personal digital assistant, cellular telephone, smartphone, tablet computer, and the like. For example, a certain embodiment of device 20 is a smartphone that includes a touchscreen display 22 (e.g., screen) occupying a significant portion of the largest surface of the device. In certain embodiments, the large size of touchscreen display 22 enables the touchscreen display 22 to present a wide variety of data, including a keyboard, a numeric keypad, program or application icons, and various other interfaces as desired. In certain embodiments, a user interacts with device 20 by touching touchscreen display 22 with a stylus, a finger, or any other appropriate object in order to interact with device 20 (i.e., select a program for execution or to type a letter on a keyboard displayed on the touchscreen display 22). In certain embodiments, a user interacts with device 20 using multiple touches to perform various operations, such as to zoom in or zoom out when viewing a document or image.

FIG. 3 illustrates a touch sensor 30 that may be utilized as touch sensor 10 of FIG. 1. Touch sensor 30 includes x-axis electrodes 32, y-axis electrodes 34, a substrate 35, and a panel 36. In some embodiments, x-axis electrodes 32 and y-axis electrodes 34 are electrodes in a self capacitance implementation (i.e., each x-axis electrode 32 and y-axis electrode 34 is capable of being driven and measured during the acquisition). In some embodiments, x-axis electrodes 32 are drive electrodes and y-axis electrodes 34 are sense electrodes in a mutual capacitance implementation. In some embodiments, x-axis electrodes 32 and y-axis electrodes 34 have a diamond pattern as illustrated in FIGS. 5A-5D below.

In some embodiments, panel 36 is a transparent panel. In other embodiments, panel 36 is not transparent. In some embodiments, substrate 35 is sandwiched between x-axis electrodes 32 and y-axis electrodes 34, and y-axis electrodes 34 are coupled to an underside of panel 36 with, for example, an adhesive. In other embodiments, touch sensor 30 includes any appropriate configuration and number of layers of electrodes and substrates. For example, some embodiments of touch sensor 30 include additional layers of sense electrodes 32 that run perpendicular (or any other appropriate angle) to y-axis electrodes 34. In some embodiments, x-axis electrodes 32 and y-axis electrodes 34 are on the same layer in any appropriate pattern (e.g., a design in which x-axis electrodes 32 and y-axis electrodes 34 have interdigitated teeth).

In certain mutual capacitance embodiments, touch sensor 30 determines the location of touch object 38 at least in part by using controller 12 to apply a pulsed a or alternating voltage to x-axis electrodes 32, which induces a charge on y-axis electrodes 34. In certain self capacitance embodiments, touch sensor 30 determines the location of touch object 38 at least in part by using controller 12 to apply a pulsed or alternating voltage to x-axis electrodes 32 and y-axis electrodes 34. When touch object 38 touches or comes within proximity of an active area of touch sensor 30, a change in capacitance may occur, as depicted by electric field lines 39 in FIG. 3. In mutual capacitance embodiments, the change in capacitance is sensed by the sense (i.e., receiving) electrodes and measured by controller 12. In self capacitance embodiments, the change in capacitance is sensed by x-axis electrodes 32 and y-axis electrodes 34 and measured by controller 12. By measuring changes in capacitance throughout an array of x-axis electrodes 32 and y-axis electrodes 34, controller 1 determines the position of the touch or proximity within the touch-sensitive area(s) of touch sensor 30.

FIG. 4 illustrates a self-capacitance embodiment of touch sensor 10. In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch sensitive areas) of touch sensor 10. This disclosure contemplates any suitable form of capacitive touch sensing, where appropriate.

Figure 5C:
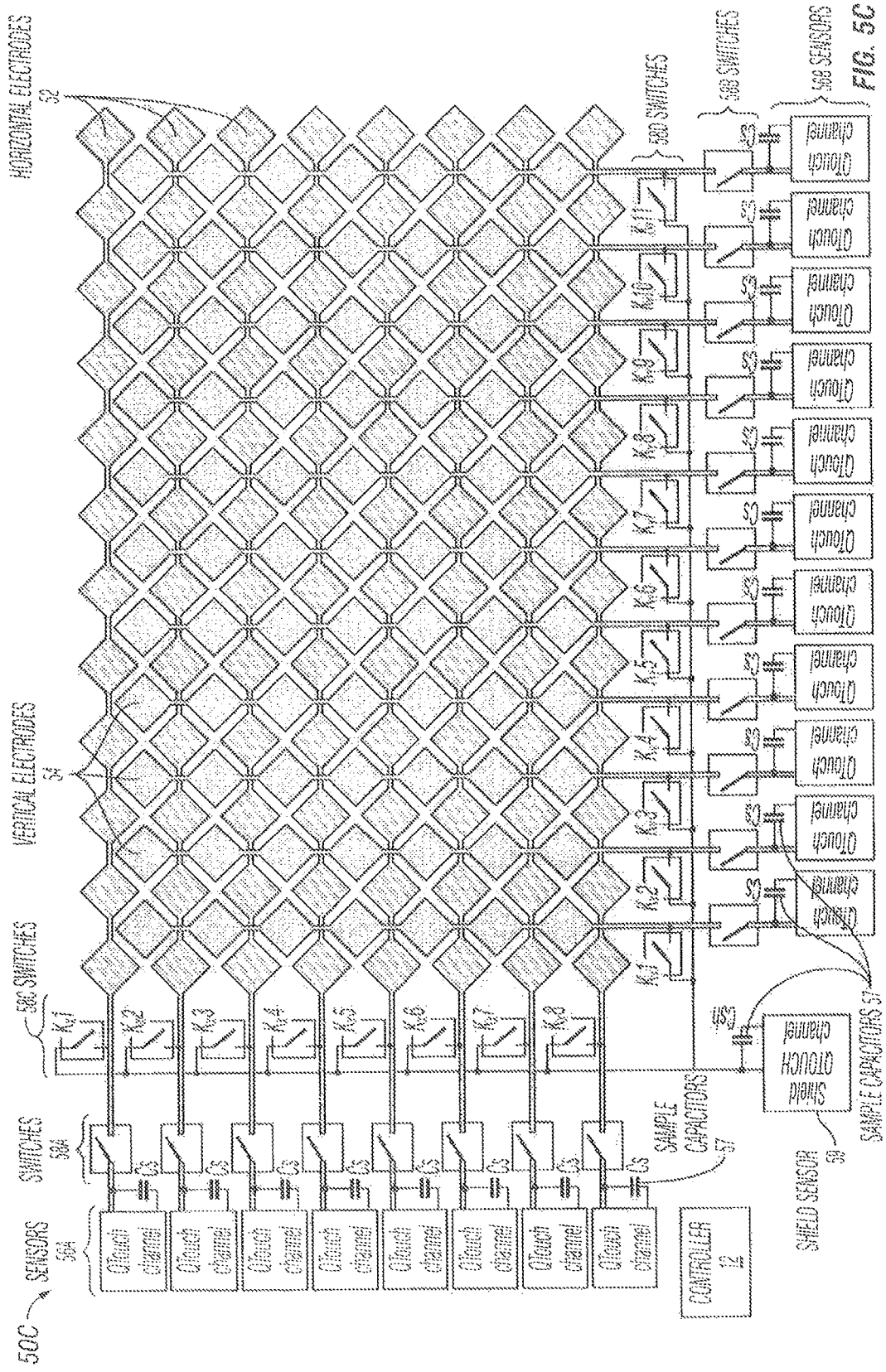
Figure 5D:
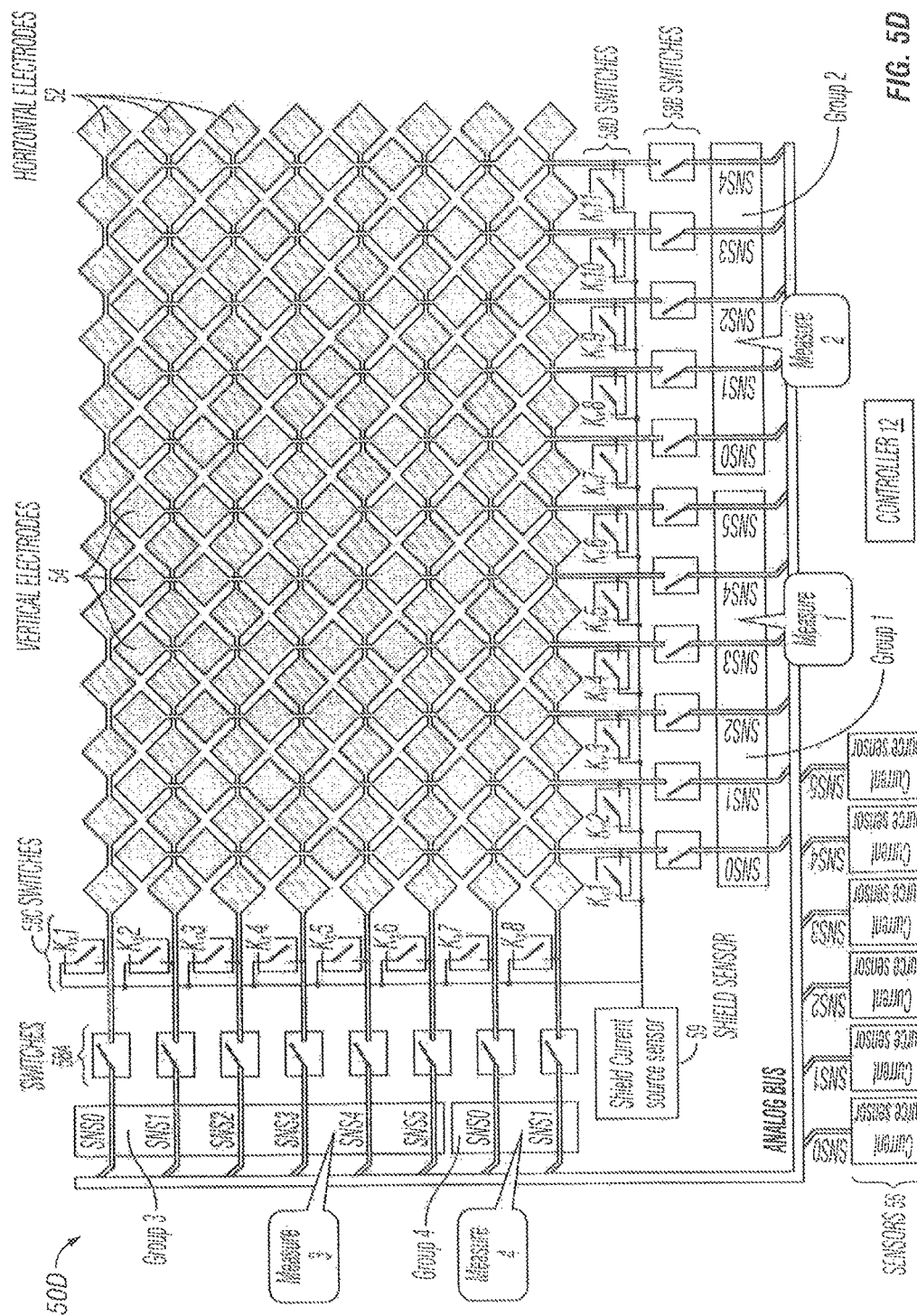

FIGS. 5A-5D illustrate pseudo driven shield switch architectures 50 of touch sensor 10 of FIG. 1 for various self capacitance measuring techniques. FIGS. 5A and 5D illustrate switch architectures 50A and 50D that utilize current source sensors. FIG. 5B illustrates a switch architecture 50B that utilize capacitive sensors. FIG. 5C illustrates a switch architecture 50C that utilizes QTouch® sensors. While specific sensors are illustrated in FIGS. 5A-5D, other embodiments may utilize any appropriate sensor.

Switch architectures 50A-50D of FIGS. 5A-5D include horizontal electrodes 52, vertical electrodes 54, sensors 56 (i.e., 56A-56D) switches 58 (i.e., 58A-58D), and one or more shield sensors 59. Switches 58 may be any appropriate switch and operate to electrically couple horizontal electrodes 52 and vertical electrodes 54 to sensors 56 and shield sensor 59. For example, switches 58A are operable to electrically couple some or all of horizontal electrodes 52 to sensors 56A, switches 58B are operable to electrically couple some or all of vertical electrodes 54 to sensors 56B, switches 58C are operable to electrically couple horizontal electrodes 52 to shield sensor 59, and switches 58D are operable to electrically couple vertical electrodes 54 to shield sensor 59.

Horizontal electrodes 52 and vertical electrodes 54 are any appropriate electrodes in any appropriate configuration. In some embodiments, horizontal electrodes 52 and vertical electrodes 54 are the x-axis 32 and y-axis 34 electrodes described above. In certain embodiments, horizontal electrodes 52 and vertical electrodes 54 form a symmetrical pattern (i.e., the exposed area of horizontal electrodes 52 and vertical electrodes 54 are substantially equal). In some embodiments, the pattern of horizontal electrodes 52 and vertical electrodes 54 is a diamond pattern (as illustrated) or any appropriate clone of a diamond pattern. In certain embodiments, horizontal electrodes 52 may not be exactly horizontal and vertical electrodes 54 may not be exactly vertical. Rather, horizontal electrodes 52 may be any appropriate angle to horizontal and vertical electrodes 54 may be any appropriate angle to vertical. This disclosure is not limited to the configuration and pattern of the illustrated horizontal electrodes 52 and vertical electrodes 54. Instead, this disclosure anticipates any appropriate pattern, configuration, design, or arrangement of electrodes.

Sensors 56 and shield sensor 59 are any appropriate sensors to sense and/or measure capacitances from horizontal electrodes 52 and vertical electrodes 54. For example, sensors 56 and shield sensor 59 may be current source sensors in some embodiments, as illustrated in FIGS. 5A and 5D. In such embodiments, current sources are used to inject a fixed amount of charge into the measured capacitance by sourcing or sinking a constant current for a fixed amount of time (Q=I*t). The change in the capacitance will result in change in the voltage at the end of the charge injection. As another example, sensors 56 and shield sensor 59 may be capacitive sensors in some embodiments, as illustrated in FIG. 5B. In some embodiments, sensors 56 and shield sensor 59 are communicatively coupled to or incorporated within controller 12.

In some embodiments, sensors 56 and shield sensor 59 may be channels of any appropriate microcontroller such as the QTouch® microcontroller, as illustrated in FIG. 5C, and may utilize any appropriate charge transfer technology. Such embodiments may include sample capacitors 57, as illustrated in FIG. 5C. For example, each sensor 56A and 56B may include an associated sample capacitor 57 (i.e., Cs) as illustrated, and shield sensor 59 may include an associated shield sample capacitor 57 (i.e., Csh), as illustrated. In some embodiments, the shield sample capacitor 57 of shield sensor 59 may be a capacitor in the range of approximately 5 nF to 100 nF. Sample capacitors 57 are adjusted in such a way to produce identical or nearly identical voltages to horizontal electrodes 52 and vertical electrodes 54 during charge transfers.

Switches 58 may be any appropriate switch that may be selectively opened or closed in order to connect or disconnect two electrical nodes. In some embodiments, switches 58 are analog switches. In other embodiments, switches 58 are any other appropriate switch. In certain embodiments, switches 58 may be controlled by controller 12.

In operation, certain embodiments combine hovering detection and proximity detection by utilizing switches 58, sensors 56, and shield sensor 59 to cause substantially equal voltages (e.g., voltages as illustrated in FIG. 6) to be present on non-measured electrodes 52 or 54 while capacitance measurements are performed on other electrodes 52 or 54. Ideally, hovering and proximity detection should be done by measuring self capacitance simultaneously on all rows and columns of a screen. However, parallel measurements of a whole screen for hovering detection requires individual capacitive sensing modules on each of the electrodes or each of the clusters of electrodes (where the proximity detection requires a single sensing module connected to all screen electrodes). For large touch screens, the number of the individual sensing modules required for hovering detection may become too numerous, so hovering detection is typically done by sequentially scanning part of screen (e.g., first all rows and then all columns).

Partial measurements of a screen, however, may create problems. For example, partial measurements may create an unwanted interaction between measured electrodes and non-measured electrodes. This interaction may affect the distribution of electrical field lines around the screen surface. One solution—holding the non-measured electrodes to a fixed voltage (e.g., GND or Vdd)—has negative effects on the measurements. For example, holding the non-measured electrodes to a fixed voltage reduces the hovering range and increase stray capacitance to GND on the boundary electrodes (i.e., measured electrodes immediately next to non-measured electrodes). As another example, if some of the electrodes are connected to a fixed voltage, the dielectric has the ability to concentrate the field lines. The result is that more of the field lines are trapped inside the dielectric and few lines can escape the dielectric in order to interact with the objects in close vicinity to the surface. In short, the combination of increased capacitive loading plus the change in the electrical field lines trajectory causes decreased ability to detect far away objects.

To remove the interaction between measured electrodes and non-measured electrodes, embodiments of the disclosure attempt to cause identical or substantially identical voltages on both measured and non-measured electrodes (i.e., make non-measured electrodes equipotential to measured electrodes) while capacitance measurements are being performed. In typical solutions, fast, high current output OpAmps may be used to drive all non-measured electrodes to the same voltage as the measured electrodes. Such solutions, however, increase the power consumption of the chip and require large silicon areas. Instead of using OpAmps for driving the non-measured electrodes, embodiments of the disclosure illustrated in FIGS. 5A-5D create a pseudo driven shield by connecting all non-measured electrodes to one or more shield sensors 59. In some embodiments, all non-measured electrodes are connected to a single line that is coupled to a single shield sensor 59. In other embodiments, all non-measured electrodes are connected to two or more shield sensor 59 using multiple lines. The pseudo driven shield architecture allows voltages on all non-measured electrodes to be equal or substantially equal to voltages of the measured electrodes.

In FIGS. 5A and 5D, a current source method is utilized to cause identical or substantially identical voltages (e.g., as illustrated in FIG. 6) on both measured and non-measured electrodes 52 and 54 while capacitance measurements are performed. In this embodiment, shield sensor 59 charges the shield (i.e., the non-measured electrodes 52 or 54) with current sources that are tuned to produce an identical charging curve as measured electrodes 52 or 54. In addition, the sensitivity of the pseudo driven shield is N times higher (when measuring charge) compared to the sensitivity of a single electrode, where N is the number of the electrodes connected to the shield (the sensitivity in the current sources method depends on the integrator gain multiplied by the ratio Cx/Cint and Cx in N times bigger). As a result, the voltage on the shield is equal to the voltages of all other measured electrodes 52 or 54.

In FIG. 5B, a current mirror method is utilized to cause identical or substantially identical voltages on both measured and non-measured electrodes 52 and 54 while capacitance measurements are performed. In this embodiment, shield sensor 59 charges the shield and the measured electrodes 52 or 54 with limited currents that are tuned to produce an identical charging curve as measured electrodes 52 or 54. For example, current mirrors are used to charge both a measured capacitor and an internal sampling capacitor as described in U.S. patent application Ser. No. 13/445,748, which is incorporated herein by reference. As a result, the voltage on the shield is equal to the voltages of all other measured electrodes 52 or 54. Without current limiters, the voltage on the shield may deviate from the voltages on the measured electrodes and hence an uncontrolled amount of charge will be transferred between the shield and the measured electrodes. While FIG. 5B illustrates a current mirror method being utilized, any other appropriate method for causing identical or substantially identical voltages on both measured and non-measured electrodes 52 and 54 while capacitance measurements are performed may be utilized.

In FIG. 5C, a QTouch® method is utilized to cause identical or substantially identical voltages on both measured and non-measured electrodes 52 and 54 while capacitance measurements are performed. In some embodiments, QTouch® uses bursts to perform the capacitance measurements. For example, the number of pulses in the burst before the input flips is the measured signal itself. As illustrated in the embodiment of FIG. 5C, the shield is connected to a shield sample capacitor 57 that has a value that produces identical voltages on non-measured electrodes 52 or 54 and the measured electrodes 52 or 54 during charge transfers. As a result, the voltage on the shield is equal to the voltages of all other measured electrodes 52 or 54.

While FIGS. 5A-5D illustrate particular measuring techniques, other embodiments may utilize any other measuring technique in which shield voltages of the shield are equal or substantially equal to the voltages on the measured electrodes 52 or 54. This disclosure anticipates using any appropriate measuring technique with the pseudo driven shield.

In some embodiments, screen measurements using the pseudo driven shield as illustrated in FIGS. 5A-5D are done in two passes. For example, in the first pass, all horizontal electrodes 52 are connected to the individual sensors 56 and all vertical electrodes 54 are connected to shield sensor 59. The measurements of all horizontal electrodes 52 and the shield are then performed simultaneously. In some embodiments, if the silicon is not able to support measurements on all horizontal electrodes 52, the unused horizontal electrodes 52 may also be connected to shield sensor 59. In the second pass, all vertical electrodes 54 are connected to the individual sensors 56 and all horizontal electrodes 52 are connected to shield sensor 59. The measurements of all vertical electrodes 54 and the shield are then performed simultaneously. In some embodiments, if the silicon is not able to support measurements on all vertical electrodes 54, the unused vertical electrodes 54 may also be connected to the shield.

When measurements using the pseudo driven shield are done in two passes as described above, the signals measured from the shield (i.e., from shield sensor 59) have some specific features. First, it is detecting the object presence evenly across the area covered by the shield because all horizontal electrodes 52 or vertical electrodes 54 are connected together. This creates a virtual electrode with the dimensions of the screen (and half of the screen area). Second, it can detect the object presence from a long distance because the parallel measurements of the shield and the horizontal electrodes 52 or vertical electrodes 54 project the electrical field lines far away from the screen surface. This allows the proximity detection signal to be obtained without having to do an additional measuring cycle. This makes the signal from the shield ideal for proximity detection.

In certain embodiments, only a portion of horizontal electrodes 52 or vertical electrodes 54 may be measured in a measurement cycle. For example, FIG. 5D illustrates an example embodiment in which there are not enough sensors 56 to connect to each of the electrodes. In this case, the measurements may be split into two or more measurements. For example, the vertical electrodes 54 may first be split into two or more groups: GROUP 1 and GROUP 2. Similarly, horizontal electrodes 52 may be split into GROUP 3 and GROUP 4. Next, GROUP 1 measurements are taken by connecting GROUP 1 electrodes to sensors 56 and connecting all other electrodes to the shield (i.e., to shield sensor 59). Next, GROUP 2 measurements are taken by connecting GROUP 2 electrodes to sensors 56 and connecting all other electrodes to the shield. Next, GROUP 3 measurements are taken by connecting GROUP 3 electrodes to sensors 56 and connecting all other electrodes to the shield. Finally, GROUP 4 measurements are taken by connecting GROUP 4 electrodes to sensors 56 and connecting all other electrodes to the shield.

FIG. 6 illustrates example voltages that may be present on the electrodes of FIGS. 5A, 5B, and 5D. In general, embodiments of the disclosure strive to keep voltages on measured lines (i.e., electrodes; top graph) and the voltage on the shield (bottom graph) identical or substantially identical. In the illustrated embodiment, the voltages increase linearly, which are specific to current source methods. In addition, the voltages include bumps where the voltages go from increasing linearly to horizontal—another feature specific to current source methods. It should be rioted that FIG. 6 is not directly applicable to QTouch® embodiments (e.g., FIG. 5C) in which the voltage rises on steps during the burst and is not increasing linearly.

Figure 7:
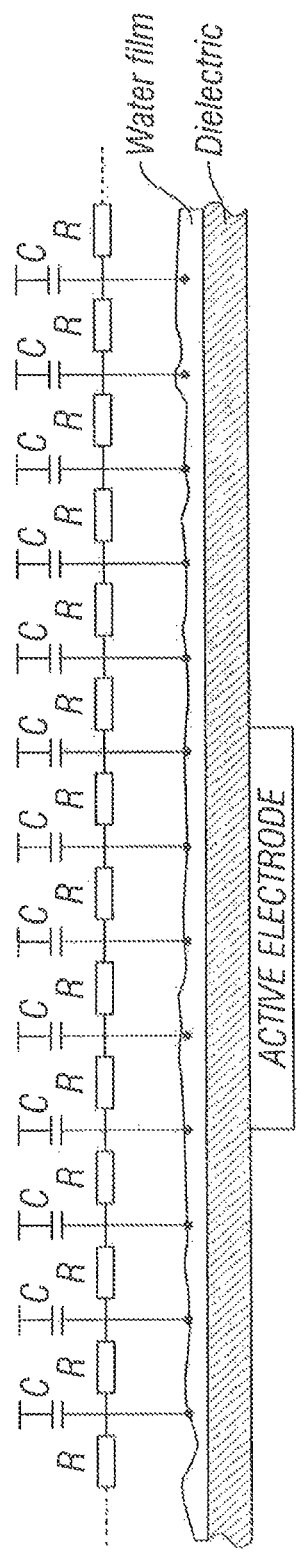
FIGS. 7-9 illustrate effects of water or moisture on touch sensors, according to certain embodiments.
Figure 8:
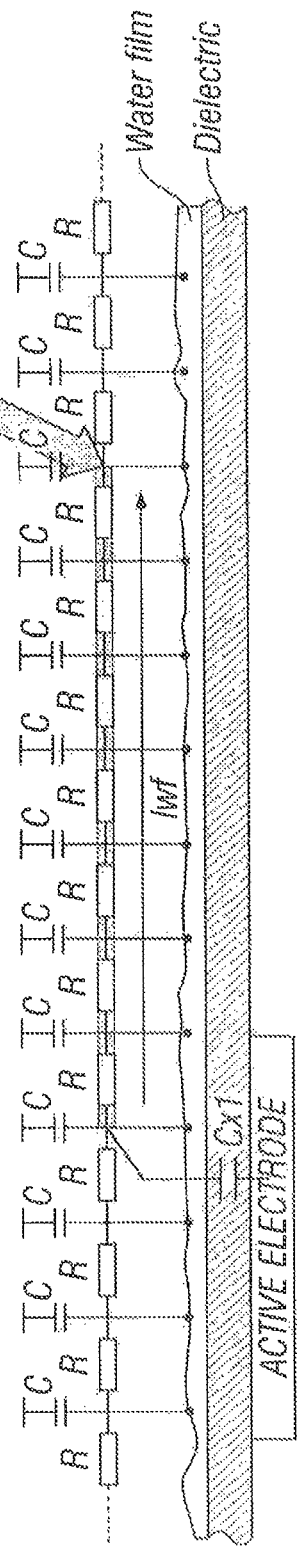
Figure 9:
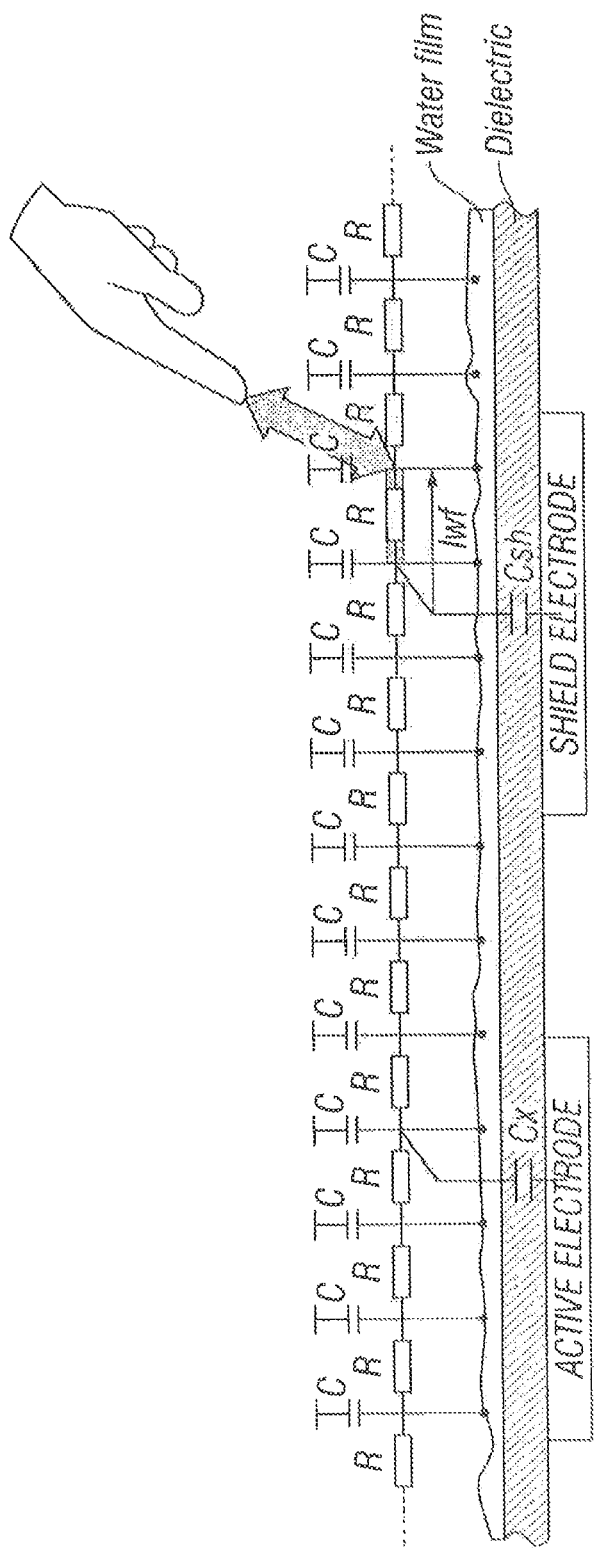

FIGS. 7-9 illustrate effects of water or moisture on touch sensors and how embodiments of the pseudo driven shield may mitigate such effects. One benefit of using embodiments of the pseudo driven shield is an increased immunity of the screen against moisture and water film. Moisture or water film on the surface of a touch screen creates a conductive film which works as distributed RC array as illustrated in FIG. 7. The presence of the conductive film on the surface can create false touches or false hover detections if a grounded object is in contact with this film, as illustrated in FIG. 8. Through the water film the presence of the object is affecting the measuring electrode via Cx1 and the water film distributed R and C (capacitive coupling between measuring electrode and the water film on top of this electrode). As illustrated in FIG. 8, some current Iwf will flow through Cx1.

When using a shield electrode as illustrated in FIG. 9, a large portion of the water film effect is cancelled through the capacitance Csh (the capacitive coupling between the shield electrode and the water film). The shield has a shunting effect and prevents the propagation of the capacitance changes introduced by the grounded object through the water film. As illustrated in FIG. 9, the same current Iwf from FIG. 8 is flowing but through capacitance Csh to the shield electrode. Although the currents continue to flow (Iwf) and may be the same strength, they are changed from where they flow. Until the active electrode and the shield are substantially equipotential, substantially no currents can flow between them. The result is that no currents are flowing through Cx1 but rather the current Iwf is flowing through Csh.

Figure 10:
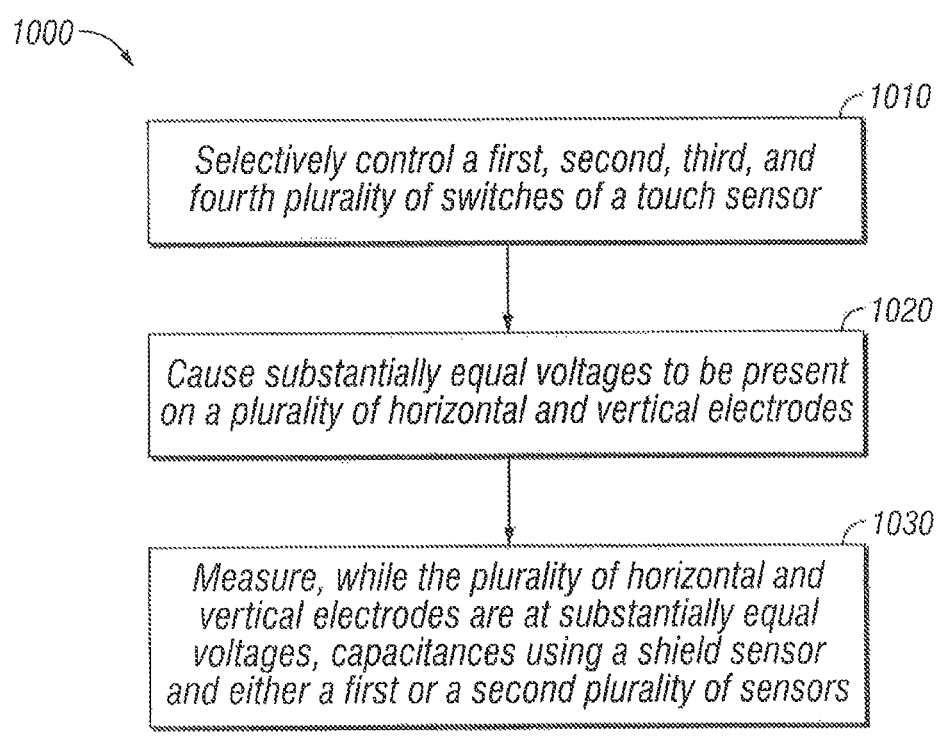
FIG. 10 illustrates an example method that is used in certain embodiments to perform proximity and hovering detection using the pseudo driven shields of FIGS. 5A-5D, according to certain embodiments.

FIG. 10 illustrates an example method 1000 that is used in certain embodiments to perform proximity and hovering detection using the pseudo driven shields of FIGS. 5A-5D. Method 1000 begins in step 1010 where a first, second, third, and fourth plurality of switches of a touch sensor are selectively controlled. In some embodiments, the touch sensor is touch sensor 10 described above. In some embodiments, the switches of step 1010 are controlled by controller 12. In some embodiments, the first plurality of switches may refer to all or a portion of switches 58A, the second plurality of switches may refer to all or a portion of switches 58B, the third plurality of switches may refer to all or a portion of switches 58C, and the fourth plurality of switches may refer to all or a portion of switches 58D. In other embodiments, the first, second, third, and fourth plurality of switches may refer to any other appropriate group of switches. In some embodiments, the switches of step 1010 may be analog switches.

In some embodiments, the first plurality of switches of step 1010 are operable to electrically couple a plurality of first electrodes of the touch sensor to a plurality of sensors, the second plurality of switches are operable to electrically couple a plurality of second electrodes of the touch sensor to the plurality of sensors, the third plurality of switches are operable to electrically couple the plurality of first electrodes to a shield sensor, and the fourth plurality of switches are operable to electrically couple the plurality of second electrodes to the shield sensor. In some embodiments, the plurality of sensors may refer to sensors 56 described above (e.g., all or a portion of sensors 56A or sensors 56B). In some embodiments, the first electrodes may refer to all or a portion of horizontal electrodes 52 and the second electrodes may refer to all or a portion of vertical electrodes 54, or vice versa. In some embodiments, the first electrodes are horizontal (i.e., x-axis) electrodes and the second electrodes are vertical (i.e., y-axis) electrodes, or vice versa. In certain embodiments, the first and second electrodes have exposed areas in a diamond pattern or any clone of a diamond pattern.

In some embodiments, the shield sensor of step 1010 may refer to one or more shield sensors 59 above. In certain embodiments, the shield sensor is a shield current source sensor, and electrodes coupled to the shield current source sensor are charged with current sources that are tuned to produce a similar charging curve as electrodes of the touch sensor that are not coupled to the shield current source sensor. In some embodiments, the shield sensor is a shield current source sensor, and the plurality of first and second electrodes are charged with limited currents that are tuned to produce identical charging. In some embodiments, the shield sensor is QTouch® channel with a sampling capacitor that has a value that produces identical voltages on electrodes coupled to the shield sensor as voltages on electrodes of the touch sensor not coupled to the shield sensor.

In some embodiments, controlling the first, second, third, and fourth plurality of switches of step 1010 includes closing at least a portion of the first plurality of switches to couple each of at least a portion of the plurality of first electrodes to a particular one of the plurality of sensors, opening the second plurality of switches to decouple (i.e., disconnect) the plurality of second electrodes from the plurality of sensors, opening the third plurality of switches to decouple the plurality of first electrodes from the shield sensor, and closing the fourth plurality of switches to couple all electrodes of the plurality of second electrodes to the shield sensor. In some embodiments, controlling the first, second, third, and fourth plurality of switches of step 1010 includes opening the first plurality of switches to decouple the plurality of first electrodes from the plurality of sensors, closing at least a portion of the second plurality of switches to couple each of at least a portion of the plurality of second electrodes to a particular one of the plurality of sensors, closing the third plurality of switches to couple all electrodes of the plurality of first electrodes to the shield sensor, and opening the fourth plurality of switches to decouple the second electrodes from the shield sensor. In general, controlling the first, second, third, and fourth plurality of switches of step 1010 includes coupling each of the electrodes that are to be measured to one of the plurality of sensors and coupling the remaining electrodes (i.e., the non-measured electrodes) to the shield (e.g., one or more shield sensors 59).

In step 1020, substantially equal voltages are caused to be present on the plurality of first and second electrodes of step 1010. In general, a variable amount of charge is injected into each electrode in such a way to cause equal or substantially equal voltages on all electrodes (when there is no touch/hovering object on the surface). In some embodiments, current sources are used and the currents are adjusted to produce an identical or substantially identically charging profile for each electrode. In embodiments where integration is used, the electrodes are charged to the same voltage and then the charge is integrated. In some embodiments, an amount of charge is injected into each of the electrodes which produces equal or substantially equal voltages on all electrodes. If current sources are used, the charging currents are adjusted in such a way to produce equal voltage profiles (but the amount of the injected charge may be different for each electrode because each electrode has a different capacitance). In some embodiments, the charge Q is found by the equation: Q=CU (where C is the capacitance, U is the voltage). In general, embodiments strive to keep U constant across all electrodes. In some embodiments, unless C is different for each electrode, Q is adjusted to keep U constant across all electrodes.

In step 1030, capacitances of certain electrodes of step 1010 are measured with the plurality of sensors while the first and second electrodes are at substantially equal voltages. In certain embodiments, step 1030 includes performing simultaneous hovering and proximity detection by causing substantially equal voltages to be present on the first and second electrodes while measuring capacitances of non-measured electrodes using the shield sensor and measuring capacitances of measured electrodes using the plurality of sensors. In some embodiments, the capacitances of step 1030 are measured using one or more of sensors 56 and/or one or more shield sensors 59. In some embodiments, measuring the capacitances of step 1030 includes measuring capacitances of one or more of the first electrodes using the plurality of sensors, measuring a single capacitance for all of the second electrodes using the shield sensor, measuring capacitances of one or more of the second electrodes using the plurality of sensors, or measuring a single capacitance for all of the first electrodes using the shield sensor.

Accordingly, example embodiments disclosed herein provide a touch sensor that is capable of simultaneously performing hover and proximity detection using a pseudo driven shield. As a result, devices utilizing embodiments of the disclosed touch sensor may have improved efficiency and power management and therefore may consume less power. Accordingly, embodiments of the disclosure provide numerous enhancements over typical touch sensors.

Although the preceding examples given here generally rely on self capacitance or mutual capacitance to operate, other embodiments of the invention will use other technologies, including other capacitance measures, resistance, or other such sense technologies.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-stale drive (SSD), a PAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, while the illustrated embodiments of the pseudo driven shield depict connecting horizontal electrodes 52 and vertical electrodes 54 to a single shield sensor 59 to form the shield, other embodiments may connect the shield to multiple shield sensors 59. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A touch sensitive device comprising:
a controller;
a plurality of first electrodes;
a plurality of second electrodes;
a plurality of sensors; and
a shield sensor; wherein the controller is operable to:
electrically couple the plurality of first electrodes to the shield sensor;
electrically couple the plurality of second electrodes to the plurality of sensors; and
cause substantially equal voltages to be present on the plurality of first and second electrodes while;
measuring capacitances of the plurality of first electrodes electrically coupled to the shield sensor; and
measuring capacitances of the plurality of second electrodes electrically coupled to the plurality of sensor; wherein
the capacitance measurements of the plurality of first and second electrodes are performed simultaneously.

2. The device of claim 1, wherein the shield sensor comprises a shield current source sensor, and the plurality of first electrodes coupled to the shield current source sensor are charged with current sources that are tuned to produce a similar charging curve as the plurality of second electrodes that are not coupled to the shield current source sensor.

3. The device of claim 1, wherein the shield sensor comprises a shield current source sensor, and the plurality of first and second electrodes are charged with limited currents that are tuned to produce identical charging.

4. The device of claim 1, wherein the shield sensor comprises a sampling capacitor that has a value that produces identical voltages on the plurality of first electrodes coupled to the shield sensor as voltages on the plurality of second electrodes not coupled to the shield sensor.

5. The device of claim 1, the controller further operable to control a first, second, third, and fourth plurality of switches, wherein:
controlling the first, second, third, and fourth plurality of switches comprises:
closing the first plurality of switches to couple each of the plurality of first electrodes to a particular one of a second plurality of sensors;
opening the second plurality of switches to decouple the plurality of second electrodes from the plurality of sensors;
opening the third plurality of switches to decouple the plurality of first electrodes from the shield sensor; and
closing the fourth plurality of switches to couple all electrodes of the plurality of second electrodes to the shield sensor; and
measuring the capacitances comprises:
measuring, using the second plurality of sensors, capacitances of each individual electrode of the plurality of first electrodes; and
measuring, using the shield sensor, a single capacitance for all of the second electrodes.

6. The device of claim 1, the controller further operable to control a first, second, third, and fourth plurality of switches, wherein:
controlling the first, second, third, and fourth plurality of switches comprises:
opening the first plurality of switches to decouple the plurality of first electrodes from a second plurality of sensors;
closing the second plurality of switches to couple each of the plurality of second electrodes to a particular one of the plurality of sensors;
closing the third plurality of switches to couple all electrodes of the plurality of first electrodes to the shield sensor; and
opening the fourth plurality of switches to decouple the second electrodes from the shield sensor; and
measuring the capacitances comprises:
measuring, using the plurality of sensors, capacitances of each individual electrode of the plurality of second electrodes; and
measuring, using the shield sensor, a single capacitance for all of the first electrodes.

7. The device of claim 1, wherein the plurality of sensors and a second plurality of sensors each comprise one of:
a current source sensor; or
a capacitive sensor.

8. A controller operable to:
electrically couple a plurality of first electrodes of a touch sensor to a shield sensor;
electrically couple a plurality of second electrodes of the touch sensor to a plurality of sensors; and
cause substantially equal voltages to be present on the plurality of first and second electrodes while:
measuring capacitances of the plurality of first electrodes electrically coupled to the shield sensor; and measuring capacitances of the plurality of second electrodes electrically coupled to the plurality of sensors; wherein the capacitance measurements of the plurality of first and second electrodes are performed simultaneously.

9. The controller of claim 8, wherein the shield sensor comprises a shield current source sensor, and the plurality of first electrodes coupled to the shield current source sensor are charged with current sources that are tuned to produce a similar charging curve as the plurality of second electrodes that are not coupled to the shield current source sensor.

10. The controller of claim 8, wherein the shield sensor comprises a shield current source sensor, and the plurality of first and second electrodes are charged with limited currents that are tuned to produce identical charging.

11. The controller of claim 8, wherein the shield sensor comprises a sampling capacitor that has a value that produces identical voltages on the plurality of first electrodes coupled to the shield sensor as voltages on the plurality of second electrodes not coupled to the shield sensor.

12. The controller of claim 8, the controller further operable to control a first, second, third, and fourth plurality of switches, wherein:
controlling the first, second, third, and fourth plurality of switches comprises:
closing the first plurality of switches to couple each of the plurality of first electrodes to a particular one of the plurality of sensors;
opening the second plurality of switches to decouple the plurality of second electrodes from the plurality of sensors;
opening the third plurality of switches to decouple the plurality of first electrodes from the shield sensor; and
closing the fourth plurality of switches to couple all electrodes of the plurality of second electrodes to the shield sensor; and
measuring the capacitances comprises one or more of:
measuring, using the plurality of sensors, capacitances of each individual electrode of the plurality of first electrodes; and
measuring, using the shield sensor, a single capacitance for all of the second electrodes.

13. The controller of claim 8, the controller further operable to control a first, second, third and fourth plurality of switches and select two more first electrodes of the plurality of first electrodes as a group of electrodes to measure, wherein
first electrodes of the plurality of first electrodes not selected to be in the selected group of electrodes comprise a non-selected group of electrodes; controlling the first, second, third and fourth plurality of switches comprises:
closing switches of the first plurality of switches that are associated with the selected group of electrodes in order to couple each of the selected group of electrodes to one of the plurality of sensors;
opening switches of the first plurality of switches that are associated with the non-selected group of electrodes in order to decouple the non-selected group of electrodes from the plurality of sensors;
opening switches of the third plurality of switches that are associated with the selected group of electrodes in order to decouple the selected group of electrodes from the shield sensor;

closing switches of the third plurality of switches that are associated with the non-selected group of electrodes in order to couple the non-selected group of electrodes to the shield sensor;
opening the second plurality of switches to decouple the plurality of second electrodes from the plurality of sensors;
closing the fourth plurality of switches to couple the second electrodes to the shield sensor; and measuring the capacitances comprises one or more of:
measuring, using the plurality of sensors, capacitances of each individual electrode of the selected group of electrodes; and
measuring, using the shield sensor, a single capacitance for all second electrodes and electrodes in the non-selected group of electrodes.

14. The controller of claim 8, wherein:
the plurality of first electrodes comprise horizontal electrodes; and the plurality of second electrodes comprise vertical electrodes.

15. A method comprising:
electrically coupling a plurality of first electrodes of a touch sensor to a shield sensor;
electrically coupling a plurality of second electrodes of the touch sensor to a plurality of sensors; and
causing substantially equal voltages to be present on a plurality of first and second electrodes while:
measuring capacitances of the plurality of first electrodes electrically coupled to the shield sensor; and
measuring capacitances of the plurality of second electrodes electrically coupled to the plurality of sensors; wherein
the capacitance measurements of the plurality of first and second electrodes are performed simultaneously.

16. The method of claim 15, wherein the shield sensor comprises a shield current source sensor, and the plurality of first electrodes coupled to the shield current source sensor are charged with current sources that are tuned to produce a similar charging curve as the plurality of second electrodes that are not coupled to the shield current source sensor.

17. The method of claim 15, wherein the shield sensor comprises a shield current source sensor, and the plurality of first and second electrodes are charged with limited currents that are tuned to produce identical charging.

18. The method of claim 15, wherein the shield sensor comprises a sampling capacitor that has a value that produces identical voltages on the plurality of first electrodes coupled to the shield sensor as voltages on the plurality of second electrodes not coupled to the shield sensor.

19. The method of claim 15, further comprising controlling a first, second, third, and fourth plurality of switches, wherein:
controlling the first, second, third, and fourth plurality of switches comprises:
closing the first plurality of switches to couple each of the plurality of first electrodes to a particular one of a second plurality of sensors;
opening the second plurality of switches to decouple the plurality of second electrodes from the plurality of sensors;
opening the third plurality of switches to decouple the plurality of first electrodes from the shield sensor; and
closing the fourth plurality of switches to couple all electrodes of the plurality of second electrodes to the shield sensor; and
measuring the capacitances comprises one or more of:

measuring, using the second plurality of sensors, capacitances of each individual electrode of the plurality of first electrodes; and measuring, using the shield sensor, a single capacitance for all of the second electrodes.

20. The method of claim 15, further comprising controlling a first, second, third, and fourth plurality of switches, wherein:

controlling the first, second, third, and fourth plurality of switches comprises:

opening the first plurality of switches to decouple the plurality of first electrodes from a second plurality of sensors;

closing the second plurality of switches to couple each of the plurality of second electrodes to a particular one of the plurality of sensors;

closing the third plurality of switches to couple all electrodes of the plurality of first electrodes to the shield sensor; and opening the fourth plurality of switches to decoupled the second electrodes from the shield sensor; and measuring the capacitances comprises one or more of:

measuring, using the plurality of sensors, capacitances of each individual electrode of the plurality of second electrodes; and measuring, using the shield sensor, a single capacitance for all of the first electrodes.

\* \* \* \* \*